United States Patent [19]

Takaichi et al.

[11] Patent Number: 5,437,880
[45] Date of Patent: Aug. 1, 1995

[54] HEALTH DRINK COMPOSITION

[75] Inventors: Akihisa Takaichi, Naruto; Toshihiko Okamoto, Tokushima; Ichiro Otsuka, Naruto; Ryuichi Hatai, Tokushima, all of Japan

[73] Assignee: Otsuka Pharmaceutical Co. Ltd., Tokyo, Japan

[21] Appl. No.: 150,043

[22] PCT Filed: Mar. 24, 1993

[86] PCT No.: PCT/JP93/00342

§ 371 Date: Nov. 17, 1993

§ 102(e) Date: Nov. 17, 1993

[87] PCT Pub. No.: WO93/19642

PCT Pub. Date: Oct. 14, 1993

[30] Foreign Application Priority Data

Mar. 27, 1992 [JP] Japan .................................. 4-071267

[51] Int. Cl.⁶ ........................ A23L 1/302; A23L 1/308
[52] U.S. Cl. ......................................... 426/73; 426/72; 426/573; 426/590; 426/599
[58] Field of Search .................. 426/72, 73, 590, 599, 426/573

[56] References Cited

U.S. PATENT DOCUMENTS

| | | | |
|---|---|---|---|
| 4,251,550 | 2/1981 | Proctor | 426/73 |
| 4,988,530 | 1/1991 | Hoersten et al. | 426/590 |
| 4,992,282 | 2/1991 | Mehansho et al. | 426/599 |
| 5,009,900 | 4/1991 | Levine et al. | 426/96 |
| 5,118,510 | 6/1992 | Kuhrts | 426/590 |
| 5,141,758 | 8/1992 | Monte | 426/590 |
| 5,153,012 | 10/1992 | Ohtaka et al. | 426/590 |

FOREIGN PATENT DOCUMENTS

| | | | |
|---|---|---|---|
| 2627671 | 9/1989 | France . | |
| 0117753 | 9/1981 | Japan | 426/73 |
| 3-160977 | 7/1991 | Japan . | |
| WO9319625 | 10/1993 | Japan . | |

Primary Examiner—Helen Pratt
Attorney, Agent, or Firm—Sughrue, Mion, Zinn, Macpeak & Seas

[57] ABSTRACT

The invention provides a health drink composition comprising a hardly digestible saccharide and a carotenoid as essential ingredients and particularly the above drink composition containing 1-30 g/100 ml of the hardly digestible saccharide and 0.5-30 mg/100 ml of the carotenoid.

9 Claims, No Drawings

HEALTH DRINK COMPOSITION

INDUSTRIAL FIELD OF UTILIZATION

The present invention relates to a health drink composition.

PRIOR ART

The contemporary man who is frequently obliged to eat irregularly and constantly exposed to various stresses and risk factors of cancer and other diseases is getting more and more conscious of his own health and accordingly more meticulous about the choice of foods and beverages. Particularly, unmarried men and women, employees dispatched to distant working places apart from their families, office ladies, executives and spouses working in double harness tend to eat out often as they visit others or make trips to remote places, and tend to fall into ill health or various states of morbidity such as obesity and adult diseases due to nutritional imbalance or over-intakes of high-energy food. Moreover, persons who dislike vegetables and/or favor meat, children having too many likes and dislikes in food, and people who are largely dependent on delicatessen food and fast food are steadily increasing in number and these people are also having fewer opportunities to take vegetables. However, reportedly an inadequate intake of vegetables, particularly green- and yellow-colored vegetables, can be a risk factor of colorectal and pulmonary cancers and the development of foods and beverages making up for deficiencies in the intake of green and yellow vegetables has been awaited. Regarding colorectal cancer, a deficiency in the intake of dietary fiber contained in vegetables is reportedly associated with its onset. As to cancer of the lung, too, an insufficient intake of carotenes which occur abundantly in green and yellow vegetables has been suggested as an etiologic factor.

Meanwhile, it has been reported that $\beta$-carotene, which is one of the so-called carotenoids, contributes to the prevention of the above-mentioned cancer and that, while as inferable from its chemical structure, this carotenoid contains many conjugated double bonds, it binds the free radicals formed in the body to stabilize them and thereby interrupt radical chain reactions (radical scavenger activity) to prevent catabolism of the body-building proteins (antioxidant activity) and, hence, prevent carcinogenesis. It has also been reported that this carotenoid is a precursor of vitamin A and has provitamin A activity, preventive activity against UV-induced suntan and immunopotentiating activity. However, no report is available about any food or beverage positively supplemented with $\beta$-carotene or about the manifestation of the above-mentioned activities after intake of such a food or beverage.

As the food or beverage for compensating for deficiencies in the dietary intake of green and yellow vegetables, beverages containing dietary fibers, particularly water-soluble polydextroses, have been explored and implemented and it is known that these beverages are effective in the relief of constipation. However, it is generally believed that dietary fibers in general decrease the shelf-life of compositions containing them and, at the same time, detract from the digestion and absorption of other concomitant ingredients. Therefore, a considerable amount of circumspection is needed in formulating a food or beverage containing a dietary fiber and, moreover, the use of a dietary fiber imposes a fairly rigorous limitation on the selection of concomitant ingredients. Particularly the use of this carotenoid in combination with an oil-soluble substance is considered difficult from the standpoint of the stability and absorption of the resultant composition. Thus, there has been no research done about foods and beverages containing a dietary fiber in combination with said carotenoid and, for that matter, no food or beverage has been developed as yet to meet the demand for the simultaneous supply of said two ingredients.

PROBLEMS THAT THE INVENTION IS TO SOLVE

The inventors of the present invention did much research for providing a carotenoid-dietary fiber combination system that would meet the above demand of the industry and found that a novel health drink composition containing a carotenoid and a hardly digestible saccharide in a predetermined ratio not only provides for the simultaneous intake of the two ingredients but, to a great surprise, the hardly digestible saccharide so contained does not substantially inhibit the absorption of the carotenoid but insures a satisfactory effect on the blood response to the carotenoid even compared with the dietary intake of green and yellow vegetables, that the shelf-life and emulsion stability of the resultant composition are very satisfactory and that the taste, smell and palatability of the composition are also satisfactory for general consumption. The present invention has been developed on the basis of the above findings.

DISCLOSURE OF THE INVENTION

The present invention is, therefore, directed to a health drink composition characterized by containing a hardly digestible saccharide and a carotenoid as active ingredients and more particularly to a health drink composition containing 1–30 g/100 ml of a hardly digestible saccharide and 0.5–30 mg/100 ml of a carotenoid, said composition further containing 0.5–20 mg/100 ml of vitamin E and 10–1000 mg/100 ml of vitamin C, and said composition further containing 1–20 g/100 ml of a natural carbohydrate.

The health drink composition of the present invention provides for the simultaneous intake of a carotenoid and a hardly digestible saccharide to meet the demand of the industry, insuring good digestibility and absorption and thus enabling an effective relief of the evil effects of irregular eating habits, improvement in health condition, prevention of obesity and onset of adult diseases, avoidance of the risk of cancer, immunopotentiation, prevention of ultraviolet radiation hazards and improvement in constipation, among other effects. Furthermore, the composition of the invention is not only excellent in the shelf-life and emulsion stability in the drink form but also very satisfactory in taste, odor and palatability.

Therefore, the drink composition of the invention is an optimal health drink for the contemporary man such as persons who would often eat out, those having few chances to eat vegetables, persons having a smoking habit, health-oriented people, persons having a constipation tendency and so on. It is also easy to ingest. In addition, this drink composition is a suitable potable nutritional supplement for the elderly, those afflicted by adult diseases and other sick persons.

The carotenoid to be used in the drink composition of this invention may be any of the carotenoids so far known in the field of food and medicine. These may be purified products of natural origin (palm carotene, Dunaliella, etc.) or synthetic products. In addition to purified products, it is possible to use a blend of carotenoids such as $\alpha$-, $\beta$- and $\gamma$-carotenes, lycopene, lutein, canthaxanthin, etc. or a powder or extract, as it is, of many an animal or plant containing any of such carotenoids. Among the above carotenoids, $\beta$-carotene is particularly preferred. The carotenoids can be incorporated in a proportion ranging from 0.5–30 mg, preferably 1–10 mg, based on 100 ml of the drink composition of the invention.

Since the above-mentioned carotenoids are oil-soluble, the drink composition of the invention, which contains them, must contain an oil as well (edible oleaginous material) and an emulsifier for emulsifying the oil as well. The kinds of such oil and emulsifier are not so critical and any of the species heretofore used generally in the food and beverage industry can be utilized. As examples of the emulsifier may be mentioned polyglycerol esters of fatty acids, glycerol esters of fatty acids, propylene glycol esters of fatty acids, sucrose esters of fatty acids, soybean phospholipids, and so on.

The hardly digestible saccharide to be used in the composition of the invention is any and all of saccharides having either the function of dietary fiber or the function of bifid bacteria growth factor or both of the functions. As specific examples of such saccharide may be mentioned polydextrose, maltodextrin, soybean oligo-saccharide, galactooligosaccharide, isomaltooligosaccharide, lactosucrose, galactomannan and its decomposition product.

Among the above hardly digestible saccharides, polydextrose is a preferred example of the saccharide having the function of dietary fiber and maltodextrin is a preferred example of the saccharide having both the function of dietary fiber and the function of bifid bacteria growth factor. Lactosucrose is a preferred species having the function of bifid bacteria growth factor.

As said polydextrose, the series of polysaccharides discovered by Pfizer Central Research Laboratory can be invariably employed. These polysaccharides can be synthesized by the thermal polymerization of glucose in the presence of an acid and a plasticizing polyol, for instance, and are commercially available. As preferred commercial products of said maltodextrin may be mentioned Matsutani Chemical's Fiber Sol (trademark), which is an amylase-digest of roasted dextrin, and Pine Fiber (trademark) (Japanese Patent Application Kokai H-2-100695, H-2-145169, H-2-154664, H-4-178094, H-4-207178, H-5-41961). Among the preferred commercial products of said lactosucrose are the products available from Hayashibara Co. and those from Ensuiko Co., (cf. Japanese Patent Publication S-59-53835). Particularly when such lactosucrose is added, the resultant composition of the invention provides for an increased population of bifid bacteria and a decreased amount of products of putrefaction in the body as the effect of formulation with the lactosucrose, thus insuring more positive cancer prophylaxis and potentiation of the immune system.

The galactomannan mentioned above includes guar gum, tara gum and locust bean gum, among others, and said decomposition product of galactomannan includes Sun Fiber (trademark of Sun Chemical Co., Japanese Patent Application Kokai S-58-212780) as a typical example. In addition, raffinose-dominant products (Japanese Patent Application Kokai S-59-179864) and galactose-dominant products (Japanese Patent Application Kokai S-58-99497) are also included.

The hardly digestible saccharide mentioned above can be added generally in a proportion of 1–30 g, preferably 3–10 g, based on 100 ml of the health drink composition of the invention. Of the above proportion, polydextrose may be used in a maximum of 20 g, preferably in the range of 3–10 g.

The health drink composition of the invention is not limited to any specific composition insofar as it is a liquid containing said carotenoid and hardly digestible saccharide as essential ingredients in the indicated proportions and, like ordinary beverages, may contain various sweeteners or natural carbohydrates, among others, as additional ingredients. Among the natural carbohydrates mentioned above are ordinary sugars such as monosaccharides, e.g. glucose, fructose, etc. and disaccharides, e.g. maltose, sucrose, etc., polysaccharides such as dextrin, cyclodextrin, etc., and sugar alcohols such as xylitol, sorbitol, erythritol and so on. As the sweeteners other than those mentioned above, natural sweeteners (thaumatine, stevia extract (e.g. rebaudioside A), glycyrrhizin, etc.), and synthetic sweeteners (saccharin, aspartame, etc.) can be used with advantage. The proportion of said natural carbohydrate is generally about 1–20 g, preferably about 5–12 g, per 100 ml of the composition of the invention.

Aside from the above, the composition of the invention may contain various nutrients, vitamins, minerals (electrolytes), flavors such as synthetic flavors and natural flavors, coloring matter and enhancer (cheese, chocolate, etc.), pectic acid and its salts, alginic acid and its salts, organic acids, protective colloid thickeners, pH control agents, stabilizers, preservatives, glycerins, alcohols, carbonating agents for carbonated beverage use, and so on. In addition, the composition of the invention may contain natural fruit juices and fruit pulps for the provision of fruit juice drinks and vegetable drinks. These ingredients can be used independently or in combination. The proportion of these additives is not so critical but can be generally selected from the range of 0 to about 20 parts by weight per 100 parts by weight of the composition of the invention.

The vitamins mentioned above include a variety of vitamins, irrespective of whether they are water-soluble or fat-soluble, such as retinol palmitate, bisbentiamine, riboflavine, pyridoxine hydrochloride, cyanocobalamin, sodium ascorbate, cholecalciferol, nicotinamide, calcium pantothenate, folic acid, biotin, choline bitartarate and so on. Among these vitamins, vitamin E and vitamin C are particularly desirable. There is no particular limitation on the proportion of such vitamins but the amount of vitamin E, for instance, can be suitably selected from the range of about 0.5–20 mg/100 ml, preferably about 1–10 mg/100 ml and that of vitamin C can be selected from the range of about 10–1000 mg/100 ml, preferably about 100–700 mg/100 ml. By adding such vitamins, cancer prophylaxis due to their antioxidant activity may be expected.

As said electrolytes (minerals) and trace elements may be mentioned ordinary species such as sodium chloride, sodium acetate, magnesium sulfate, magnesium chloride, calcium chloride, dipotassium phosphate, monosodium phosphate, calcium glycerophosphate, sodium iron succinate-citrate, manganese sulfate, copper sulfate, zinc sulfate, sodium iodide, potassium sorbate, zinc, manganese, copper, iodine, cobalt and so on. The level of addition of them can be freely selected as necessary.

The drink composition of the invention can be manufactured by blending the above-mentioned ingredients. The method of manufacture is not limited. Thus, for example, all the ingredients can be simultaneously blended but it is a preferred practice to dissolve the carotenoid in an oil vehicle in the first place and emulsify the resultant solution with an aqueous solution of said hardly digestible saccharide and other additives in the presence of an emulsifier. More specifically, a typical process comprises adding a solution or crystals of the carotenoid to a mixture of water and a suitable emulsifier and mixing the resultant emulsion with an aqueous solution of said hardly digestible saccharide and other ingredients. The mixing of said ingredients may be carried out at room temperature but is preferably performed at a somewhat elevated temperature. The emulsification mentioned above can be carried out by any of the conventional procedures using an emulsifying machine, such as a homomixer or a high-pressure homogenizer, which is suited for each procedure, in a throughput process or in a recycling process. The resultant emulsion can be filtered, filled into suitable containers and sterilized in the per se conventional manner to provide the object beverage products. The sterilization mentioned above can be achieved by autoclaving or filtration through a bacterial filter. For the provision of a carbonated beverage from the composition of the invention, carbon dioxide gas may be bubbled through the above-mentioned emulsion.

In accordance with the invention there is provided a novel health drink composition containing a carotenoid and a hardly digestible saccharide in a suitable ratio. This composition insures a simultaneous intake of both ingredients, with good absorption of the carotenoid, and provides for excellent shelf-life and emulsion stability of the final product, freedom from the bitterness and foreign odor unwanted in beverages, and fully satisfactory taste, smell and palatability characteristics.

BEST MODE OF PRACTICING THE INVENTION

Some examples of manufacture of the health drink composition of the invention are presented below for a more detailed disclosure of the invention.

EXAMPLES 1–11

Health drink compositions according to the invention were manufactured from $\beta$-carotene, hardly digestible saccharide (polydextrose, lactosucrose), emulsifier (sucrose esters of fatty acids), oil (citrus essential oil), natural carbohydrate (fructose-glucose syrup, sucrose and fructose), organic acid (citric acid, tartaric acid, lactic acid), vitamin (ascorbic acid and tocopherol), flavor and sweetener according to the formulas set forth in Table 1.

With the resultant health drink compositions of the invention, the recipient's body can be effectively supplemented with $\beta$-carotene.

EXAMPLES 12–17

In the same manner as the above Examples, health drink compositions of the invention were manufactured from $\beta$-carotene, hardly digestible saccharide (polydextrose, fructooligosaccharide), natural carbohydrate (fructose and glucose), rebaudioside A and various anions and cations according to the formulas set forth in Table 2.

With these health drink compositions of the invention, the recipient's body can be effectively supplemented with $\beta$-carotene.

EXAMPLE 18–35

In the same manner as the above Examples, health drink compositions of the invention were manufactured from $\beta$-carotene, various hardly digestible saccharides, natural carbohydrate (fructose and glucose) and organic acid according to the formulas set forth in Table 3.

With these health drink compositions of the invention, the recipient's body can be effectively supplemented with $\beta$-carotene.

TABLE 1

| Ingredient (in 100 ml) | | 1 | 2 | 3 | 4 | 5 | 6 | 7 | 8 | 9 | 10 | 11 |
|---|---|---|---|---|---|---|---|---|---|---|---|---|
| $\beta$-Carotene | (mg) | 3 | — | 10 | 8 | 1 | — | 30 | 5 | 3 | — | 6 |
| Extracted carotene | (mg) | — | 5 | — | 7 | 2 | — | — | 7 | 7 | 6 | — |
| Polydextrose | (g) | 5 | 3 | 5 | 7 | 4 | 2 | 10 | 20 | 20 | 5 | 5 |
| Emulsifier | (mg) | 6 | 10 | 20 | 30 | 5 | 6 | 20 | 15 | 8 | 12 | 15 |
| Oil | (mg) | 10 | 14 | 30 | 40 | 2 | 7 | 70 | 15 | 6 | 15 | 16 |
| Natural carbohydrates | | | | | | | | | | | | |
| Isomerized sugar | (g) | 6 | 14 | 10 | 6 | 5 | 3 | — | — | 4 | 6 | 8 |
| Purified sucrose | (g) | 2 | — | — | — | 5 | 6 | 5 | — | 4 | 5 | 8 |
| Fructose | (g) | — | 2 | 3 | — | — | — | 3 | 10 | 4 | — | — |
| Glucose | (g) | 3 | — | — | 5 | — | 2 | 5 | — | 4 | — | — |
| Organic acids | | | | | | | | | | | | |
| Citric acid | (mg) | 200 | 350 | 100 | 300 | 50 | 150 | — | — | — | 50 | 100 |
| Tartaric acid | (mg) | — | — | 50 | — | 50 | 10 | 100 | 200 | — | — | — |
| Malic acid | (mg) | — | 50 | 10 | 50 | — | 10 | — | — | 100 | — | 40 |
| Lactic acid | (mg) | — | — | — | — | 50 | 10 | 100 | — | 200 | — | — |
| Vitamins | | | | | | | | | | | | |
| Ascorbic acid | (mg) | 300 | 200 | 100 | 50 | 30 | 150 | 200 | 100 | 50 | 500 | 200 |
| Vitamin E | (mg) | 10 | 5 | 4 | 7 | 3 | 5 | 20 | 1 | 5 | 6 | 8 |
| Fructooligosaccharide | (g) | 3 | 5 | 10 | — | 2 | 7 | 5 | — | 4 | 2 | 5 |
| Carbon dioxide volume | | — | — | — | — | — | — | 2 | 3 | 3 | 2 | 4 |
| Flavor & sweetener | | q.s. | q.s. | q.s. | q.s. | q.s. | q.s. | q.s. | q.s. | q.s. | q.s. | q.s. |

TABLE 2

| Ingredient (in 100 ml) | | Example No. 12 | 13 | 14 | 15 | 16 | 17 |
|---|---|---|---|---|---|---|---|
| β-Carotene | (mg) | 200 | — | 100 | 50 | 80 | — |
| Extracted carotene | (mg) | — | 90 | 50 | — | 20 | 70 |
| Polydextrose | (g) | 50 | 60 | 30 | 100 | 30 | 40 |
| Emulsifier | (mg) | 100 | 120 | 80 | 300 | 200 | 150 |
| Oil | (mg) | 70 | 40 | 18 | 120 | 210 | 150 |
| Lactate ion$^{(-)}$ | | 1 | 1 | 1 | 2 | 1 | 1 |
| Tartarate ion$^{(2-)}$ | | 0 | 0 | 1 | 0 | 1 | 2 |
| Malate ion$^{(2-)}$ | | 0 | 0 | 1 | 0 | 1 | 2 |

TABLE 3

| Ingredient (in 100 ml) | | Example No. 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|
| β-Carotene | (mg) | 2 | — | 5 | 6 | 3 | 10 | 4 | 7 | — | — | 8 | 30 | 3 | 1 | 15 | 20 | 5 | — |
| Extracted carotene | (mg) | — | 8 | 1 | 5 | — | — | — | — | 6 | 3 | — | — | 12 | — | — | — | — | 2 |
| Hardly digestable saccharides | | | | | | | | | | | | | | | | | | | |
| Fiber Sol | (g) | 5 | 10 | 20 | — | — | — | — | — | — | — | — | — | — | — | — | 5 | — | — |
| Pine Fiber | (g) | — | — | — | 4 | 8 | — | — | — | — | — | — | — | — | — | — | — | 7 | — |
| Soybean oligo-saccharide | (g) | — | — | — | — | — | 5 | 10 | — | — | — | — | — | — | — | — | — | — | — |
| Galacto-oligo-saccharide | (g) | — | — | — | — | — | — | — | — | 3 | 9 | — | — | — | — | — | — | — | — |
| Isomaltooligo-saccharide | (g) | — | — | — | — | — | — | — | — | — | — | 4 | 12 | — | — | — | — | — | — |
| Lactosucrose | (g) | — | — | — | — | — | — | — | — | — | — | — | — | 4 | 10 | — | — | — | — |
| Sun Fiber | (g) | — | — | — | — | — | — | — | — | — | — | — | — | — | 5 | 13 | — | — | 4 |
| Emulsifier | (mg) | 6 | 20 | 15 | 30 | 8 | 10 | 12 | 15 | 10 | 7 | 5 | 20 | 50 | 9 | 70 | 33 | 25 | 12 |
| Oil | (mg) | 8 | 15 | 30 | 70 | 4 | 7 | 45 | 15 | 70 | 2 | 20 | 60 | 5 | 8 | 10 | 27 | 30 | 4 |
| Natural carbohydrates | | | | | | | | | | | | | | | | | | | |
| Isomerized sugar | (g) | 4 | 4 | 3 | — | 5 | 2 | 3 | — | 1 | 4 | 3 | 7 | 2 | 7 | 3 | 2 | 6 | — |
| Purified sucrose | (g) | 3 | — | 4 | 3 | 5 | 2 | 1 | — | 2 | 2 | — | — | 5 | 6 | — | 1 | — | 2 |
| Fructose | (g) | — | 2 | 3 | 3 | — | 2 | — | 10 | — | 3 | — | — | 3 | — | — | 5 | 1 | 8 |
| Glucose | (g) | — | 3 | — | 3 | — | — | 1 | — | — | — | 2 | — | — | — | 1 | 2 | — | — |
| Organic acids | | | | | | | | | | | | | | | | | | | |
| Citric acid | (mg) | 100 | 150 | 200 | 300 | — | 50 | — | — | — | 250 | 170 | — | 100 | 350 | — | 100 | — | 150 |
| Tartaric acid | (mg) | — | 10 | 10 | — | 50 | 50 | 200 | 200 | 100 | — | 20 | 100 | — | — | 200 | 10 | — | — |
| Malic acid | (mg) | 50 | 10 | — | — | 100 | 50 | — | — | 200 | — | 10 | — | 50 | — | 100 | — | — | 30 |
| Lactic acid | (mg) | — | — | 10 | 30 | 50 | 50 | 100 | — | — | 70 | — | 50 | — | 50 | 50 | 100 | 150 | — |
| Vitamins | | | | | | | | | | | | | | | | | | | |
| Ascorbic acid | (mg) | 300 | 200 | 100 | 50 | 200 | 300 | 40 | 100 | 500 | 150 | 250 | 100 | 50 | 200 | 300 | 300 | 150 | 500 |
| Vitamin E | (mg) | 10 | 5 | 3 | 15 | 3 | 5 | 7 | 1 | 8 | 2 | 6 | 3 | 15 | 3 | 5 | 1 | 4 | 10 |
| Carbon dioxide volume | | — | — | — | — | — | — | — | — | — | — | — | — | — | — | — | 2 | 3 | 4 |
| Flavor & sweetener | | q.s. | q.s. | q.s. | q.s. | q.s. | q.s. | q.s. | q.s. | q.s. | q.s. | q.s. | q.s. | q.s. | q.s. | q.s. | q.s. | q.s. | q.s. |

| Natural carbohydrates | | | | | | | |
|---|---|---|---|---|---|---|---|
| Isomerized sugar | (g) | — | 5 | 3 | 6 | — | 10 |
| Purified sucrose | (g) | — | 4 | — | 2 | — | 3 |
| Fructose | (g) | 20 | 10 | 15 | 10 | 15 | 12 |
| Glucose | (g) | 2 | 1 | 2 | 3 | 2 | 1 |
| Fructooligosaccharide | (g) | — | 5 | 1 | 6 | 4 | 8 |
| Rebaudioside A | (mg) | 80 | 75 | 83 | 73 | 70 | 85 |
| Cations (mEq/l) (total) | | 27.5 | 21.5 | 27.5 | 22.5 | 13.5 | 33.5 |
| Na$^+$ | | 21 | 15 | 21 | 15 | 8 | 27 |
| K$^+$ | | 5 | 5 | 5 | 5 | 4 | 5 |
| Ca$^+$ | | 1 | 1 | 1 | 2 | 1 | 1 |
| Mg$^+$ | | 0.5 | 0.5 | 0.5 | 0.5 | 0.5 | 0.5 |
| Anions (mEq/l) (total) | | 27.5 | 21.5 | 27.5 | 22.5 | 13.5 | 33.5 |
| Cl$^{(-)}$ | | 16.5 | 10.5 | 16.5 | 10.5 | 6.5 | 17.5 |
| Citrate ion$^{(3-)}$ | | 10 | 10 | 8 | 10 | 4 | 11 |

We claim:

1. A health drink composition comprising 1–30 g/100 ml of a hardly digestible saccharide, an oil, an emulsifier, vitamin E, malodextrin, and 0.5–30 mg/100 ml of a carotenoid as active ingredients.

2. A health drink composition comprising 1–30 g/100 ml of a hardly digestible saccharide, 0.5–30 mg/100 ml of a carotenoid, an oil, and an emulsifier as active ingredients.

3. The health drink composition of claim 2 wherein the hardly digestible saccharide is selected from the group consisting of polydextrose, maltodextrin, soybean oligosaccharide, galactooligosaccharide, isomaltooligosaccharide, lactosucrose, and galactomannan and its decomposition product.

4. The health drink composition of claim 2 wherein the carotenoid is carotene.

5. The health drink composition of claim 2 comprising 1–30 g/100 ml of at least one hardly digestible saccharide selected from the group consisting of polydextrose and, a mixture of polydextrose and maltodextrin and 0.5–30 mg/100 ml of carotene.

6. The health drink composition of claim 3 further comprising 0.5–20 mg/100 ml of vitamin E and 10–1000 mg/100 ml of vitamin C.

7. The health drink composition as claimed in any one of claims 1 through 6 further comprising 1–20 g/100 ml of natural carbohydrate.

8. A health drink composition comprising

| Polydextrose | 1–20 g/100 ml |
| Carotene | 0.5–30 mg/100 ml |
| Vitamin E | 0.5–20 mg/100 ml |
| Vitamin C | 10–1000 mg/100 ml |
| Natural carbohydrate | 1–20 g/100 ml | and an oil and an emulsifier.

9. The health drink composition of claim 8 wherein the polydextrose is maltodextrin.

* * * * *

REEXAMINATION CERTIFICATE (3322th)

United States Patent [19]
Takaichi et al.

[11] B1 5,437,880
[45] Certificate Issued Sep. 9, 1997

[54] HEALTH DRINK COMPOSITION

[75] Inventors: Akihisa Takaichi, Naruto; Toshihiko Okamoto, Tokushima; Ichiro Otsuka, Naruto; Ryuichi Hatai, Tokushima, all of Japan

[73] Assignee: Otsuka Pharmaceutical Co., Ltd., Tokyo, Japan

Reexamination Request:
No. 90/004,303, Jul. 16, 1996

Reexamination Certificate for:
Patent No.: 5,437,880
Issued: Aug. 1, 1995
Appl. No.: 150,043
Filed: Nov. 17, 1993

[22] PCT Filed: Mar. 24, 1993
[86] PCT No.: PCT/JP93/00342
§ 371 Date: Nov. 17, 1993
§ 102(e) Date: Nov. 17, 1993
[87] PCT Pub. No.: WO93/19642
PCT Pub. Date: Oct. 14, 1993

[30] Foreign Application Priority Data

Mar. 27, 1992 [JP] Japan ............ 4-071267

[51] Int. Cl.⁶ .................... A23L 1/302; A23L 1/308
[52] U.S. Cl. .................... 426/73; 426/72; 426/573; 426/590; 426/599
[58] Field of Search .................... 426/72, 73, 573, 426/590, 599

[56] References Cited

U.S. PATENT DOCUMENTS

| | | |
|---|---|---|
| 4,859,488 | 8/1989 | Kan . |
| 5,114,723 | 5/1992 | Stray-Gundersen . |
| 5,153,012 | 10/1992 | Ohtaka . |
| 5,294,606 | 3/1994 | Hastings . |

FOREIGN PATENT DOCUMENTS

| | | |
|---|---|---|
| 3-127970 | 5/1991 | Japan . |
| 4-99472 | 3/1992 | Japan . |
| 5-268919 | 3/1992 | Japan . |

OTHER PUBLICATIONS

21 C.F.R. §172.841, 184, 184.1277, 184. 1444.
Product Label for "Vegetake" produced by Kirin Brewery.
Nikkei Sangyou Shimbun; Jan. 24, 1990.

*Primary Examiner*—Helen Pratt

[57] ABSTRACT

The invention provides a health drink composition comprising a hardly digestible saccharide and a carotenoid as essential ingredients and particularly the above drink composition containing 1-30 g/100 ml of the hardly digestible saccharide and 0.5-30 mg/100 ml of the carotenoid.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–8 is confirmed.

Claims 1, 2, 9 are cancelled.

New claims 10–21 and 22 are added and determined to be patentable.

*10. The health drink composition of claim 2 wherein the hardly digestible saccharide is polydextrose.*

*11. The health drink composition of claim 2 wherein the hardly digestible saccharide is lactosucrose.*

*12. The health drink composition of claim 2 wherein the carotenoid is a purified product of natural origin.*

*13. The health drink composition of claim 2 wherein the carotenoid is palm carotene.*

*14. The health drink composition of claim 2 wherein the carotenoid is Dunaliella.*

*15. The health drink composition of claim 2 wherein the carotenoid is a synthetic cartenoid.*

*16. The health drink composition of claim 2 wherein the carotenoid is a purified cartenoid.*

*17. The health drink composition of claim 2 wherein the carotenoid consists of a blend of two or more members selected from the group consisting of an α-carotene, a β-carotene, a γ-carotene, lycopene, lutein and canthaxanthin.*

*18. The health drink composition of claim 1, wherein the carotenoid is in an amount of 1 to 10 mg/100 ml of the drink composition.*

*19. The health drink composition of claim 2 wherein the carotenoid is in an amount of 1 to 10 mg/100 ml of the drink composition.*

*20. The health drink composition of claim 1 wherein the hardly digestible saccharide is polydextrose.*

*21. The health drink composition of claim 1 wherein the hardly digestible saccharide is soybean oligosaccharide.*

*22. The health drink composition of claim 1 wherein the hardly digestible saccharide is lactosucrose.*

* * * * *